United States Patent [19]

Kishi et al.

[11] Patent Number: 4,556,833
[45] Date of Patent: Dec. 3, 1985

[54] NUMERICAL CONTROL DEVICE

[75] Inventors: Hajimu Kishi, Hino; Masaki Seki, Tokyo; Kunio Tanaka; Takashi Takegahara, both of Hachioji, all of Japan

[73] Assignee: Fanuc Ltd., Minamitsuru, Japan

[21] Appl. No.: 460,244

[22] PCT Filed: May 18, 1982

[86] PCT No.: PCT/JP82/00179
  § 371 Date: Jan. 17, 1983
  § 102(e) Date: Jan. 17, 1983

[87] PCT Pub. No.: WO82/04138
  PCT Pub. Date: Nov. 25, 1982

[30] Foreign Application Priority Data

May 18, 1981 [JP] Japan .................. 56-074680

[51] Int. Cl.$^4$ .................................................. G05B 19/00
[52] U.S. Cl. .................................. 318/567; 364/474; 318/568
[58] Field of Search ................ 318/567, 568; 364/474

[56] References Cited

U.S. PATENT DOCUMENTS 3,895,354 7/1975 Kish .
4,152,765 5/1979 Weber .................................. 318/568

FOREIGN PATENT DOCUMENTS 49-46083 2/1974 Japan .
53-43183 4/1978 Japan .
2094023 9/1982 United Kingdom .

OTHER PUBLICATIONS

Supplementary European Search Report, The Hague, Examiner: J. P. Ressenaar Completed: 10/3/84.

Primary Examiner—William M. Shoop, Jr.
Assistant Examiner—Saul M. Bergmann
Attorney, Agent, or Firm—Staas & Halsey

[57] ABSTRACT

A numerical control device 102, in which a processor 102a numerically controls a machine tool 103, is provided with an external storage unit 201 for storing machining data conforming to various shape patterns, input means 202, an editing processor 102c and an internal memory 102d, in order to implement a function for the creation of numerical control information. Machining data, corresponding to a part code entered from the input means 202, is read out of the external storage unit 201c. The editing processor 102c creates numerical control information, which is stored in the internal memory, from the machining data and, e.g., numerical values input from the input means 202.

5 Claims, 12 Drawing Figures

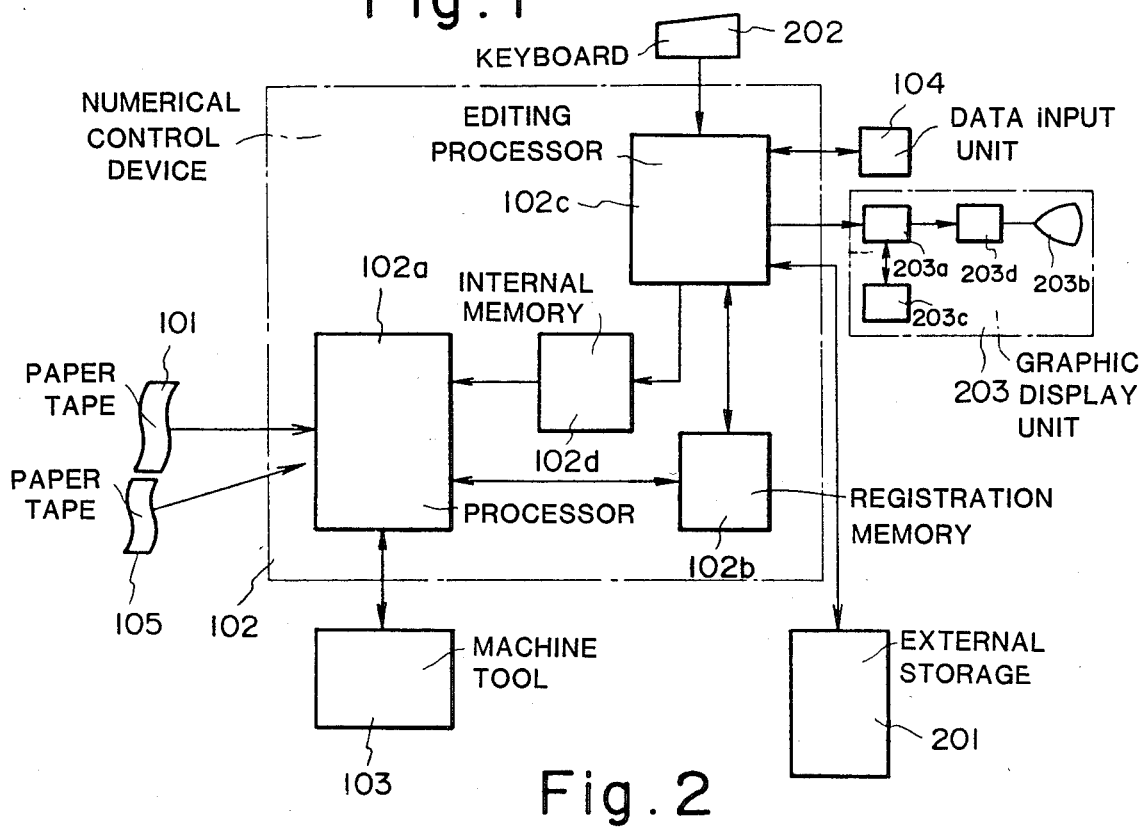
Fig. 1
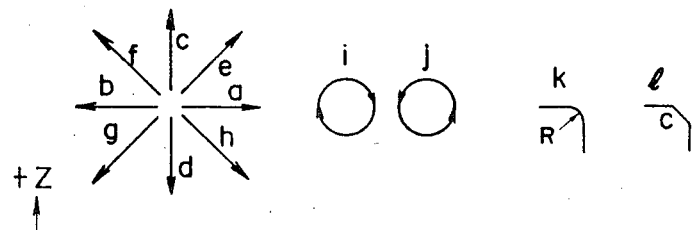
Fig. 2
Fig. 3
| Shape Element | ← | ↘ | ↑ | ↗ | → | ↘ | ↓ | ↙ | ○ | ○ | C | R |
|---|---|---|---|---|---|---|---|---|---|---|---|---|
| Symbol | 1 | 2 | 3 | 4 | 5 | 6 | 7 | 8 | 9 | 0 | C | R |

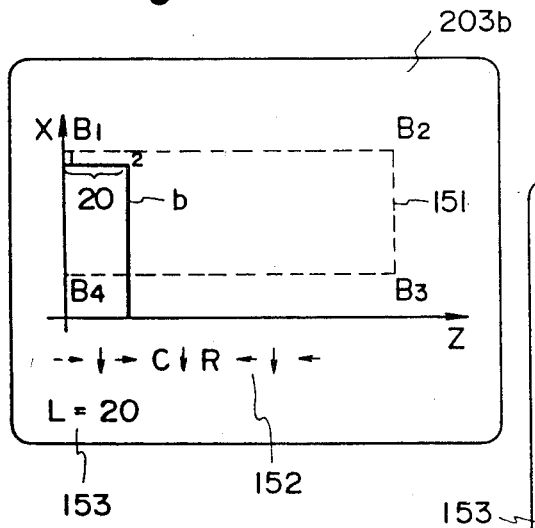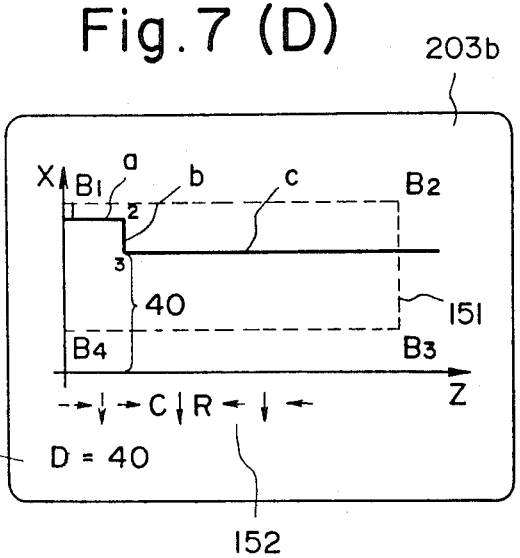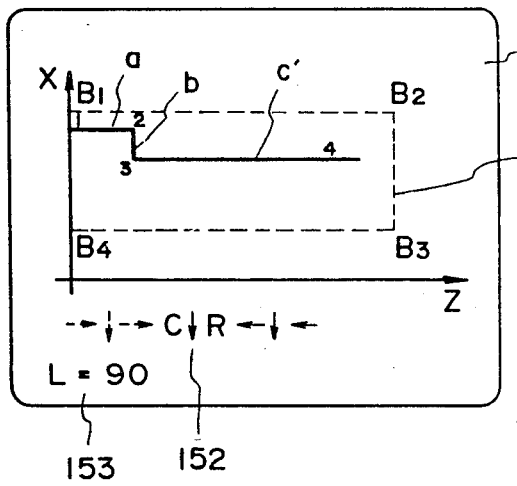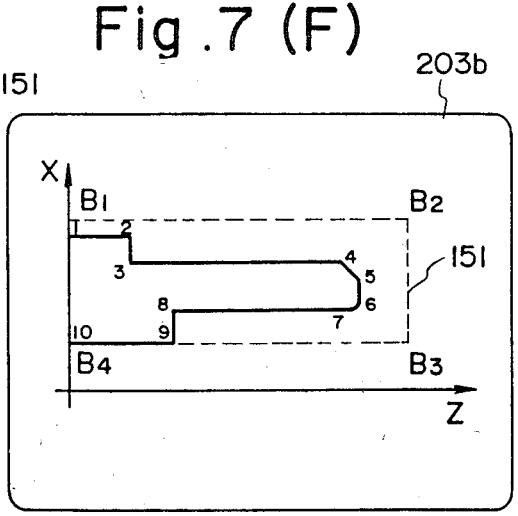

NUMERICAL CONTROL DEVICE

BACKGROUND OF THE INVENTION

This invention relates to a numerical control device for numerically controlling a machine such as a machine tool and, more particularly, to a numerical control device equipped with a function for creating numerical control information in a simple and rapid manner.

In recent years, machining operations have been automated by placing machine tools under the control of numerical control devices. In order to have a numerically controlled machine tool machine a workpiece in conformance with a drawing, the numerical control device (referred to as an NC) must be provided with numerical control information having a predetermined format.

Such numerical control information generally is created by programming based on manual calculations or for the control of machining for a plurality of three-dimensional shapes, the information is created by an apparatus incorporating a computer for creating the numerical control information automatically. These methods, however, require considerable experience to implement. In the case of programming using manual calculation, moreover, considerable programming time is required and programming errors are likely to occur. Furthermore, since the above methods of creating numerical control information are practiced by using an apparatus separate from the numerical control device, another disadvantage is the need for a separate input operation requiring a great deal of time to enter requiring a great deal of time to enter the numerical control information into the numerically controlled device.

SUMMARY OF THE INVENTION

Accordingly, an object of the present invention is to provide a numerical control device in which numerical control information can be created and entered in simple and rapid fashion.

Another object of the present invention is to provide a numerical control device which is capable of creating numerical control information within the numerical control device in accordance with information input to the numerical control device.

According to the present invention, a numerical control device is provided with a function for creating numerical control information. This function is achieved by storing, in a storage unit external to the numerical control device, machining data defining various fundamental shape patterns for mechanical machining; entering a part code from an input unit; reading machining data specified by the part code out of the storage unit; and separately entering, e.g., numerical values indicating dimensions or machining conditions to complement the machining data, wherein an editing processor creates numerical control information by using the machining data read out of the external storage medium as well as the separately entered numerical values or machining conditions. The numerical control information is stored in an internal memory connected to the processor of the numerical control device.

BRIEF DESCRIPTION OF THE DRAWINGS

FIG. 1 is a block diagram of a numerical control device embodying the present invention;

FIG. 2 illustrates shape elements used in the present invention to define various shapes to be machined;

FIG. 3 illustrates the relationship between shape elements and symbols according to the present invention;

DESCRIPTION OF THE PREFERRED EMBODIMENT

Figure 4:
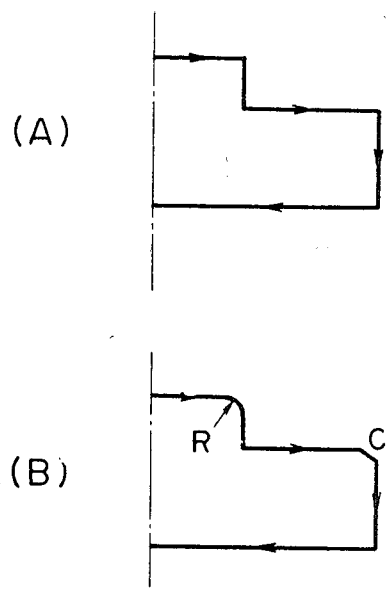
FIG. 4 shows a profile defined by shape elements according to the present invention.

An embodiment of the present invention will now be described in detail with reference to the drawings.

FIG. 1 is a block diagram of a numerical control device embodying the present invention. In FIG. 1, numeral 101 denotes a paper tape bearing punched numerical control information, 102 denotes a numerical control device (hereinafter NC) constructed in the form of a computer, 103 denotes a machine tool, 104 indicates a data input unit (hereinafter MDI), and 105 indicates a paper tape bearing a number of subprograms and user macros. It should be noted that the paper tapes 101 and 105, the NC 102, the machine tool 103 and the MDI 104 construct a numerical control system identical with that of the prior art. Specifically, a processor 102a belonging to the NC 102 executes numerical control processing to control the machine tool 103 on the basis of numerical control information input from the paper tape 102. When the numerical control information read from the paper tape 101 is a call instruction calling a subprogram or user program (user macro), the processor 102a calls the desired subprogram or user macro from a registration memory 102b, in which a number of subprograms or user macros have been registered, and executes processing in accordance with the called subprogram of user macro. It should be noted that the numerical control information may be stored not only on paper tape but in storage media such as bubble memory cassettes and cassette tapes, and may be entered from such storage media. It will be assumed here that subprograms or user macros are stored in the registration memory 102b from the paper tape 105 via the processor 102a.

Numeral 201 denotes an external storage unit such as a bubble cassette in which machining data corresponding to various shape patterns are stored in advance. The machining data includes: (1) the type of machining (e.g., rough machining, groove machining, finishing machining, thread cutting), (2) shape code, and (3) data which specifies tool motion (e.g., dimensions of various portions of a shape specified by shape codes, as well as feed speed). It should be noted that there are cases where the given machining data comprises data of all three types (1) through (3), data of types (1) and (2) only, or data of types (1) and (2) with a portion of data of type (3). The data of type (3) can also be made to incorporate subprograms and user macro call instructions. The following is an example of machining data:

18; 1; 57571;          (1)

This is an example in which only data of types (1) and (2) are given as the machining data, wherein "18;" is a code indicating the type of machining, "1;" indicates the shape of the starting stock (round bar), and "57571"

is a shape code representing the shape pattern. A shape pattern is created in the following manner:

A rough part profile can be represented by 12 different shape elements as shown in FIG. 2. There are elements a, b indicating the + and − directions, respectively, elements c, d indicating the + and − directions, respectively, elements e, f, g, h indicating directions of $\{45°+90°\cdot i(i=0,1,2,3)\}$, respectively, elements i, j indicating the clockwise and counter-clockwise directions, respectively, and element k indicating corner rounding, and element l indicating corner chamfering. If the symbols 1, 2, ... 9, 0, R, C are assigned to respective ones of these shape elements, as shown in FIG. 3, then the profile illustrated in FIG. 4(A) can be expressed by → ↓ → ↓ ← (57571), and the profile shown in FIG. 4(B) can be expressed by →R ↓ →C ↓ (5R75C71).

The following can also be stored as machining data:

$$18;\ 1;\ 575R7R5797;\ G00X160.0\ Z180.0;\\ G71\ P010\ Q020;\\ N010\ G01X_\triangle \ldots _\triangle;\\ N011\\ \vdots\\ N020\ G01-Z_\square \ldots _\square; \qquad (2)$$

This is an example in which data of all three types (1) through (3) are given as the machining data, wherein "18;" is a two-digit code indicating the type of machining. It should be noted that the machining types include, for example a finishing cycle, an outer diameter rough cutting cycle, an end face rough cutting cycle, a closed loop cutting cycle, an end face projection cutting cycle, a grooving cycle and a threading cycle. A suitable two-digit numerical value is assigned for each of these cycles. The abovementioned value "18;" corresponds to the outer diameter rought cutting cycle. Further, "1;" represents the shape of the stock material, "575R7R5797;" is a shape code. "G00×160.0 Z180.0;" is command data for positioning the machine tool at the machining starting point, and the group of data from "G71" onward are data specifying tool motion, of which "G71" is a preparatory function (G-function) instruction, indicating the outer diameter rough cutting cycle, and corresponds to the two-digit code "18;" indicative of the type of machining. "P010" indicates the start of data as well as the sequence number thereof, and "Q020" indicates the end of data as well as the sequence number thereof. Thus, "P010 Q020" signifies that data specifying tool motion begins at sequence number "010" and ends at sequence number "020".

Figure 5:
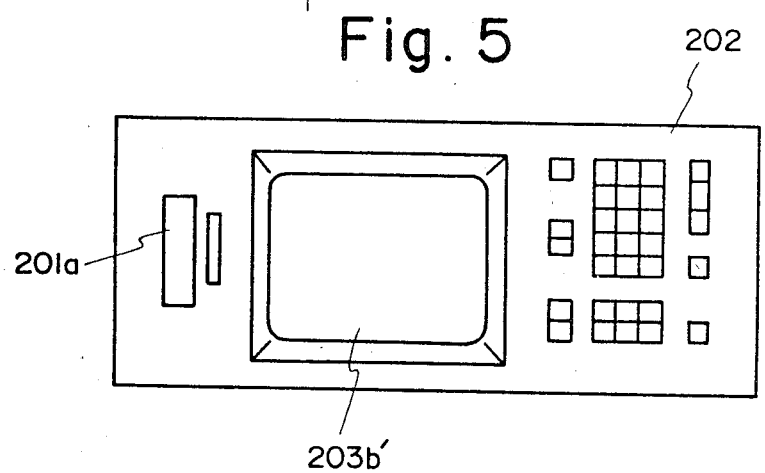
FIG. 5 is a front view of an integrated keyboard, graphic display unit and bubble cassette adapter according to the present invention.

Returning to FIG. 1, numeral 202 denotes a keyboard for entering part codes indicative of predetermined machining data stored in the external storage unit 201, or for entering numerical values specifying an amount of movement, as well as machining conditions, machining content and the like. Numeral 203 denotes a graphic display unit which includes a display controller 203a, a cathode-ray tube 203b, a refresh memory 203c for storing display data, and a pattern generating circuit 203d for generating graphics based on display data. It should be noted that a (bubble cassette) adapter 201a in which external storage unit 201 (bubble memory-cassette) is set, the keyboard 202 and the cathode-ray tube 203b of the graphic display unit may be constructed unitarily as shown in FIG. 5.

Figure 6:
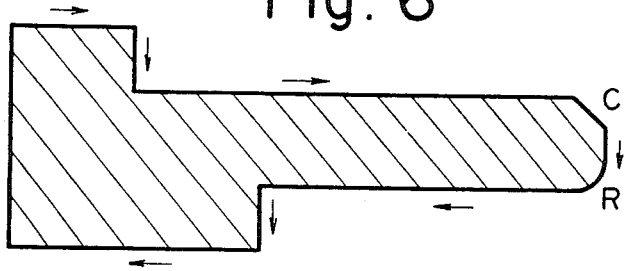
FIGS. 6 and 7A-7F illustrate entering dimensions according to the present invention.

When a part code corresponding to, for example, the profile shown in FIG. 6 is keyed in from the keyboard 202, an editing processor 102c constituted by a microprocessor within the NC reads the machining data for the profile selected from the external storage unit 201 using the input part code as a key. The machining data corresponds to the profile shown in FIG. 6 and has the following configuration:

$$18;\ 1;\ 575C7R171; \qquad (3)$$

Figure 7:
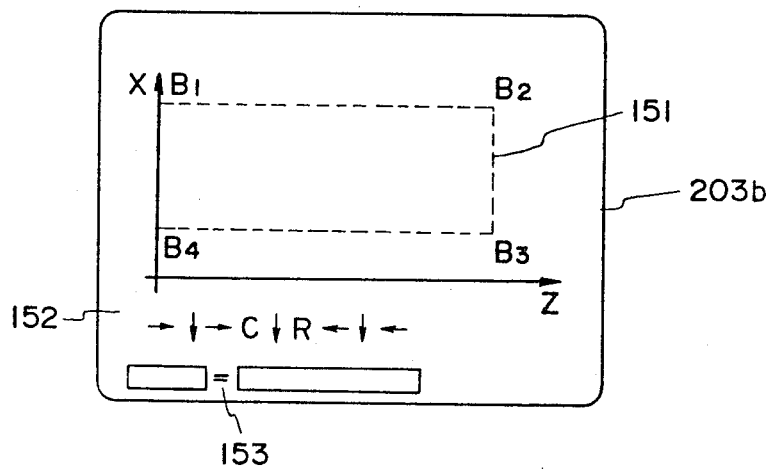
Figure 7:
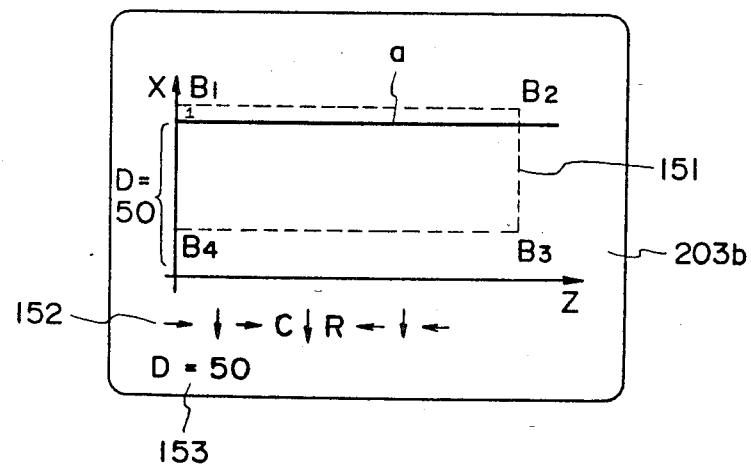

Upon being read, such machining data is applied, via the editing processor 102c, to the display controller 203a of the graphic display unit 203, where the data is converted into display data and loaded in the refresh memory 203c. The display data is thenceforth read from the refresh memory 203c continuously via the display controller 203a so that the graphics and symbols illustrated in FIG. 7(A) are displayed on the CRT 203b on the basis of the display data. In FIG. 7(A), the dashed line 151 indicates the shape of the stock material, and numeral 152 denotes a group of shape element symbols corresponding to the shape code 575C7R171 indicated at (3) above. In other words, the group of shape element symbols 152 represents, in terms of shape element symbols, the profile of FIG. 6 specified by the shape code "575C7R171". Numeral 153 denotes a portion of the display at which various messages, such as inquiries directed to the operator, are displayed.

Since the machining data indicated by (3) above does not include data specifying tool motion, it is necessary that the operator enter the various dimensions using the keyboard 202 while viewing the displayed design drawings. The dimensions are entered in order starting from the shape element at the far left of the shape element symbol group 152. As the required dimensions are entered by the operator, these are decoded by the editing processor 102c which then describes the machining profile on the CRT screen in sequential fashion. For example, with regard to the shape element symbol → displayed at the far left of the shape element symbol group 152 in FIG. 7(A), the display portion 153 prompts the operator with "D=", in response to which "D=50" is entered. When this is done, a straight line a at X=50 is immediately written on the display screen [FIG. 7(B)], with a serial number (sequence number) "1" appearing at the starting point. This serial number is used later for the purpose of indicating a particular point on the machining profile. Next, the display shifts to an inquiry regarding the length of the drawn straight line a, at which time the display portion 153 prompts the operator with "L=". The operator responds by entering the value of the indicated dimension. For example, "20" is keyed in from the keyboard 202, followed by pressing a transmit key, whereupon the line a is formed into a line segment corresponding to the length 20, with a serial number 2 appearing at the end point of the line. This ends the processing for the entry of the dimension relating to the first shape segment symbol →, causing the symbol → at the far left of the shape element symbol group to vanish from the screen. Processing for the next shape element symbol ↓ now takes place. Specifically, the shape to be processed next is given by ↓, which information causes a straight line b to be drawn on the CRT 203b vertically downward from the serial number 2, as shown in FIG. 7(C). The operator, in response to a prompt "D=" regarding the length of the drawn straight line b, enters the dimensional value using the keyboard 202. For example, the operator keys in "40" and presses the transmit key, whereupon the line B is transformed into a line segment where the diameter at the end point corresponds to "40", as depicted in FIG. 7(D), with a serial number 3 appearing at the end point. The foregoing operation ends processing for the entry of the dimension relating to the shape element symbol →, and the shape element symbol ↓ vanishes from the display screen. Next, in response to information "→" for the shape element symbol to be processed subsequently, a straight line c is drawn to the right from the end point of the line segment b, as illustrated in FIG. 7(D), and operations similar to those described heretofore are performed in such fashion as to set the length of a line segment c, as shown in FIG. 7(E). These operations are repeated until the entry of part dimensions describing the profile shown in FIG. 7(F) are completed. The input dimensions are converted into ordinary numerical control information by the editing processor 102c, and then loaded in an internal memory 102d to end processing for the creation of the numerical control information. The created numerical control information is identical to (2) shown above. Thereafter, the numerical control information is read out of memory 102d successively by the processor 102a so that ordinary numerical control processing may be performed. The case described hereinabove relates to the entry of dimensions only. It should be noted, however, that entries are not limited solely to dimensions but that feed speed and other machining conditions may be entered as well.

The foregoing describes machining not including data specifying tool motion. If the completed machining data has the configuration indicated by (2), above however, the data from block G71 to the block at sequence number "N020" serves directly as numerical control information. When it is necessary to correct (e.g., deletion, addition or modification), the machining data already entered, correction is accomplished by the editing processor 102c by entering correction information from the MDI. Furthermore, the machining data can be made to incorporate a call instruction G65P∆∆∆∆ for calling a user macro or subprogram. Here G65 is a G-function instruction indicative of a user macro instruction, and P∆∆∆∆ is a code specifying the user macro that is to be called.

According to the present invention as described above, numerical control information can be created by providing an external storage unit in which items of machining data relating to basic shape patterns in accordance with various machining profiles are stored, entering the part code of the shape desired to be machined and reading these items of machining data in the machining operation, and entering numerical values or machining conditions in addition to the machining data. It is therefore possible to create numerical control information in a very simple and rapid manner. Since these functions are provided in a numerical control device, moreover, a separate input operation other than that for creating the numerical control information is unnecessary. This makes it possible to operate the device quickly and accurately.

Furthermore, according to the present invention, the arrangement is such that a part code corresponding to a desired profile is entered, a graphic is displayed on a display unit on the basis of machining data in accordance with the part code, and the various dimensions, machining conditions and the like are entered while the operator views the displayed design drawing. This enables numerical control information to be created even more simply, accurately and quickly.

Also, since the displayed shape gradually approaches the design drawing as it is changing with the entry of the various dimensions, reliability is enhanced because there is little chance for error in entering the numerical data. In addition, since the final profile also is displayed, comparison against the design drawing is very easy, thereby enabling positive verification of the desired shape. Operability is excellent, because it is unnecessary to create separate NC tapes. When it is desired to perform an identical machining operation at some later date, the numerical control information stored in memory need only be delivered to an external storage medium such as a bubble cassette. Since the arrangement is such that machining data corresponding to a part code is stored in an external storage medium such as a bubble cassette, a general purpose arrangement can be provided by storing machining data conforming to shapes which are actually to be machined, or by preparing bubble cassettes storing a variety of machining data and selecting the appropriate cassette for the particular purpose.

We claim:

1. A numerical control device having a processor for executing control processing and controlling a machine tool on the basis of numerical control information, said numerical control device including:
   external storage means for storing machining data corresponding to a plurality of shape patterns;
   input means for inputting a part code identifying a shape pattern, machining conditions, and numerical values;
   editing processor means, operatively connected to said external storage means and to said input means, for reading from said external storage means, machining data in accordance with the part code, and for creating numerical control information based on said machining data, said numerical values and machining conditions entered from said input means; and
   internal memory means, operatively connected to said editing processor and to daid processor, for storing said numerical control information created by said editing processor, and for entering said numerical control information into said processor.

2. A numerical control device according to claim 1, further including a display means, operatively connected to said editing processor, for displaying a shape pattern corresponding to said machining data read from said external storage means.

3. A numerical control device according to claim 1, wherein said numerical control information comprises machining data corresponding to a combination of shape elements selected from a plurality of predetermined shape patterns.

4. A numerical control device according to claim 2, wherein said input means is housed with a screen of said display unit.

5. A method of creating numerical control information for controlling a machine tool comprising the steps of:
   a. defining a set of standard shapes;
   b. defining corresponding machining data for the set of standard shapes;
   c. reading part codes corresponding to a desired shape to be machined;
   d. reading dimensions associated with each part code;
   e. converting the part code and dimensions into numerical control information in accordance with said corresponding machining data;
   f. executing numerical control in accordance with the numerical control information generated in step e.

* * * * *